Figure 1:
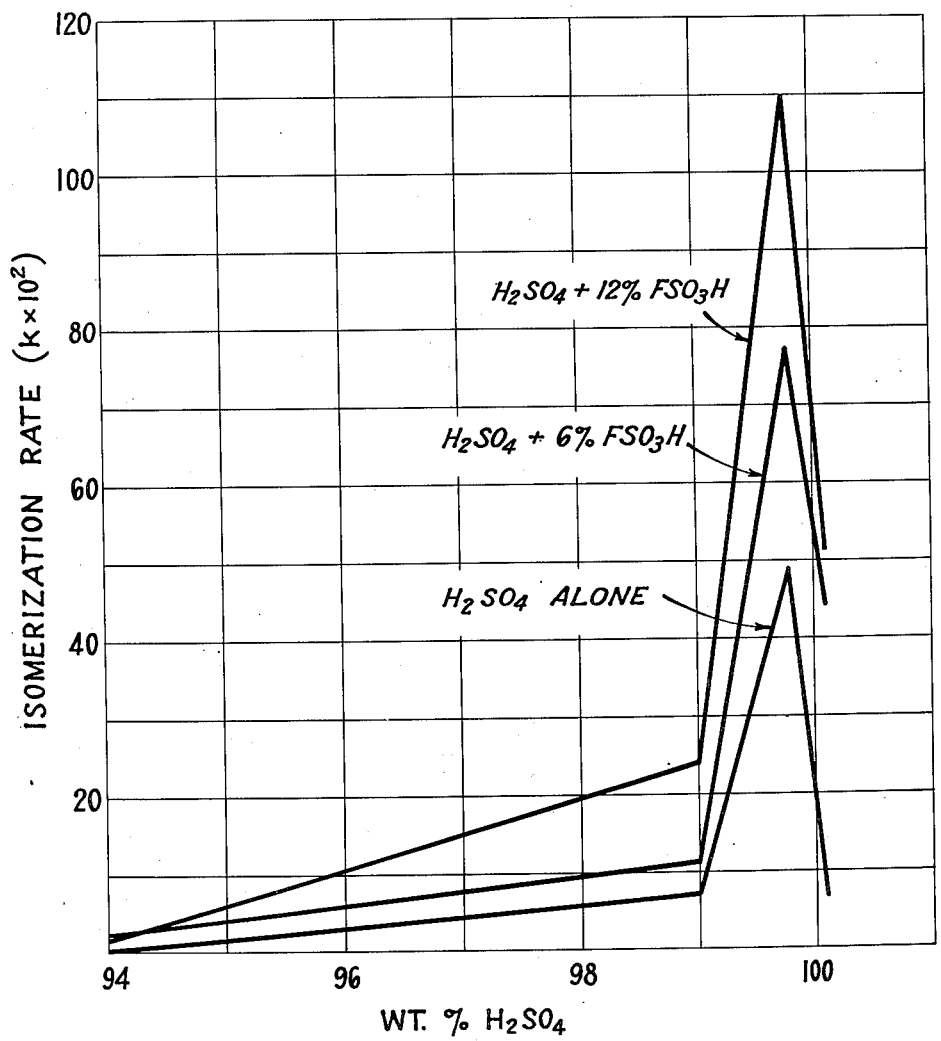

INVENTORS:
Alan K. Roebuck
Bernard L. Evering

INVENTORS:
Alan K. Roebuck
Bernard L. Evering
BY Sam B Becker
ATTORNEY

Patented Aug. 14, 1951

2,564,080

UNITED STATES PATENT OFFICE 2,564,080

ISOMERIZATION OF SATURATED HYDROCARBONS WITH MIXED ACID CATALYSTS

Alan K. Roebuck, Hammond, Ind., and Bernard L. Evering, Chicago, Ill., assignors to Standard Oil Company, Chicago, Ill., a corporation of Indiana Application June 29, 1949, Serial No. 102,014

10 Claims. (Cl. 260—666)

This invention relates to a process and catalysts for the isomerization of alkyl-substituted, particularly methyl-substituted, saturated hydrocarbons. By the term "isomerization" as used herein we intend to define a process for shifting or transferring an alkyl group from one carbon atom to another carbon atom within a saturated hydrocarbon molecule to produce either a chain isomer or a geometric isomer.

In a more particular aspect, this invention is concerned with novel catalysts for use in a process for effecting the isomerization of monomethyl-substituted alkanes or of dimethyl-substituted alkanes, the latter containing no quaternary carbon atom and having a secondary carbon atom adjacent a methyl-substituted carbon atom.

Sulfuric acid is a well-known catalyst for the type of isomerization reactions which form the subject of our invention. Thus, U. S. Patent 2,404,661 of R. T. Sanderson, issued July 23, 1946, describes the isomerization of 2,4-dimethylpentane to 2,3-dimethylpentane in the presence of 95 percent sulfuric acid and expresses a preference for the use of 97 percent sulfuric acid as the isomerization catalyst. U. S. Patent 2,373,740 of S. F. Birch et al., issued April 17, 1945, describes the interconversion of 2,3- and 2,4-dimethylpentanes in the presence of concentrated sulfuric acid and presents three working examples in which 97 percent sulfuric acid was employed. P. D. Caesar and A. W. Francis, Ind. Eng. Chem. 33, 1426-8 (1941), likewise employed 97 percent sulfuric acid at 50° C. for the isomerization of 2,4-dimethylpentane to 2,3-dimethylpentane.

It has also been proposed to employ halogen sulfonic acids, particularly fluosulfonic acid, as catalysts for the isomerization of paraffin hydrocarbons (U. S. Patents 2,344,889 and 2,344,890, both patented March 21, 1944). However, the halogen sulfonic acids, particularly fluosulfonic acid, are active cracking catalysts for paraffin hydrocarbons and the desired isomerization reaction in the presence of these catalysts is therefore attended by a considerable production of light gases, tars, etc., representing a useless degradation of the charging stock and resulting in rapid deactivation of the catalyst. It has been proposed to employ fluosulfonic acid as a paraffin isomerization catalyst at low temperatures of the order of −30 to −60° C., presumably to minimize cracking reactions (U. S. Patent 2,373,740). However, the use of very low temperatures necessitates expensive refrigeration of the reaction mixture and it would be desirable to develop a process capable of operating without the necessity of refrigeration. The use of hydrogen has also been proposed to suppress the cracking activity of fluosulfonic acid (U. S. Patent 2,344,889) when it is employed to catalyze the isomerization of various paraffin hydrocarbons.

However, it has not heretofore been appreciated that the rate of isomerization of certain alkyl-substituted, particularly methyl-substituted, saturated hydrocarbon charging stocks is closely connected with the concentration of the sulfuric acid employed as the catalyst. We have found that the concentration of the sulfuric acid has an unexpected and important bearing on the rate of isomerization of certain saturated hydrocarbons, as will be pointed out in detail hereinafter, and have established a narrow and critical range of sulfuric acid concentrations within which this catalyst may best be employed for the relatively high-rate isomerization of certain methyl-substituted saturated hydrocarbons. Nor has it been appreciated that the specific activity of sulfuric acid as an isomerization catalyst can be significantly augmented by the addition thereto of a promoter selected from the group consisting of fluosulfonic acid and chlorosulfonic acid, without incurring the penalty of excessive hydrocarbon decomposition and cracking, which follow upon the use of the halogen sulfonic acids alone as catalysts for the isomerization of saturated hydrocarbons.

It is an object of this invention to provide a novel process for the isomerization of alkyl-substituted, particularly methyl-substituted, saturated hydrocarbons, particularly monomethyl or dimethyl-substituted alkanes, having a secondary carbon atom adjacent a methyl-substituted carbon atom. Another object of this invention is to provide an improved process for the catalytic isomerization of monomethylpentanes and 2,3- or 2,4-dimethylpentanes. Still another object of our invention is to provide a method for increasing the rate of isomerization of certain saturated hydrocarbons. A further object of our invention is to provide a continuous process for the high-rate isomerization of certain saturated hydrocarbons. An additional object of our invention is to provide novel catalysts and a method for increasing the rate of isomerization of certain saturated hydrocarbons to a value far in excess of that obtainable by the employment of sulfuric acid alone, while retaining the advantages of a controlled isomerization reaction practically unaccompanied by cracking reactions. These and other objects will become apparent from the ensuing description of our invention read in conjunction with the annexed figures.

We have found that the rate of isomerization of various methyl-substituted saturated hydrocarbons in sulfuric acid is closely connected with the concentration of the sulfuric acid and that, surprisingly, the initial concentration of the sulfuric acid catalyst charged to the isomerization reactor should be between 99 and 100 percent sulfuric acid in order to obtain a maximum and surprisingly increased rate of isomerization as compared with sulfuric acid of other concentrations, for example 96% or 97% concentrated sulfuric acid or fuming sulfuric acids, which are articles of commerce.

When 96–98 weight percent sulfuric acid is employed as a catalyst for the isomerization of various saturated hydrocarbons, the rate of isomerization is low at room temperature or moderately elevated temperatures, while elevated temperatures above about 50° C. are impractical because of the rapid oxidative attack of the acid catalyst upon the hydrocarbon. When fuming sulfuric acid is employed as the isomerization catalyst, the acid rapidly oxidizes and degrades the saturated hydrocarbon stock, even at room temperature and the catalyst is rapidly diluted with water and other hydrocarbon degradation products, causing a sharp decline in the isomerization capacity of the catalyst. Furthermore, as will be shown hereinafter, the rates of isomerization obtained with fuming sulfuric acids are far lower than those induced by sulfuric acid of 99 to 100 weight percent concentration.

We have further found that chlorosulfonic acid and, particularly, fluosulfonic acid, can be employed as promoters with sulfuric acid and greatly increase the rate of hydrocarbon isomerization, as will be brought out in detail in the examples below, which are intended to illustrate but not unnecessarily to limit our invention.

In the following specific examples of our invention, the hydrocarbon charging stock was intimately contacted with about an equal weight of the mixed acid catalyst, usually by vigorous mechanical stirring, in a glass reaction vessel at room temperature (20 to 25° C.) for a period of time sufficient to obtain substantial reaction, usually one hour unless otherwise indicated.

The isomerization rate, $k$ was determined by the use of the standard formula $$k = \frac{X_e}{a} \frac{2.303}{t} \log \frac{X_e}{X_e - X}$$

wherein $X_e$ is the amount of product formed at equilibrium, $a$ is the initial concentration of reactant, $t$ is time and $X$ is the amount of product formed in time $t$. In order to lay a consistent basis for comparison of isomerization rates and for reasons of convenience that will appear hereinafter, $k$ was determined at the end of a reaction period of one hour, except where otherwise indicated. As a result $k \times 10^2$ is approximately equivalent to mol percent conversion of the hydrocarbon charging stock per hour.

EXAMPLE 1

Employing the above-described operating technique, 3-methylpentane was isomerized with sulfuric acid catalysts of various initial concentrations, extending from a concentration of 94 weight percent of sulfuric acid to 100.1 weight percent sulfuric acid. The significant data are presented in Table 1 and Figure 1. The results are extremely surprising and indicate that as the sulfuric acid concentration is increased to about 99 weight percent, a very large unexpected increase in the rate of isomerization occurs. The precipitous increase in the rate of isomerization attains a maximum at 99.7 to 99.8 sulfuric acid. It will be noted from Table 1 that the rate of isomerization with 100.1% sulfuric acid was considerably lower than with 99.8% sulfuric acid. The isomerization reaction involved is evidently complicated by the concurrent progress of other and undesired reactions, such as oxidative attack of sulfuric acid upon the hydrocarbon charging stock, which apparently rapidly reduces the strength and the isomerization power of the acid by the production of water and, possibly, acid-soluble hydrocarbon oxidation products. Apparently the best balance of desirable and undesirable reactions is reached by the employment of sulfuric acid having an initial concentration of 99.7 or 99.8 weight percent.

TABLE 1

3-methylpentane isomerization

| Concentration, wt. per cent $H_2SO_4$ | $k \times 10^2$ for $H_2SO_4$ | $k \times 10^2$ for $H_2SO_4 + 6\%$ $FSO_3H$ | $k \times 10^2$ for $H_2SO_4 + 12\%$ $FSO_3H$ |
|---|---|---|---|
| 94 | 0.1 | 2 | 1.4 |
| 99 | 7 | 11 | 24 |
| 99.8 | 49 | 77 | 110 |
| 100.1 | 6 | 44 | 51 |

It will be noted from the data in Table 1 and from Figure 1 that although fluosulfonic acid significantly augmented the isomerization activity of sulfuric acid employed in various concentrations, very large increases were obtained with sulfuric acid concentration between about 99 and 100 weight percent.

EXAMPLE 2

The effects of variations in the concentration of $FSO_3H$ (commercial grade) in 99.8 wt. percent sulfuric acid upon the rate of isomerization of 3-methylpentane are presented in the following table.

TABLE 2

| Wt. Per Cent $FSO_3H$ in $H_2SO_4$ | $k \times 10^2$ |
|---|---|
| 0 | 49 |
| 2 | 62 |
| 4 | 74 |
| 6 | 77 |
| 8 | 90 |
| 12 | 110 |
| 15 | 62 |
| 20 | 57 |
| 25 | 66 |

Figure 2:
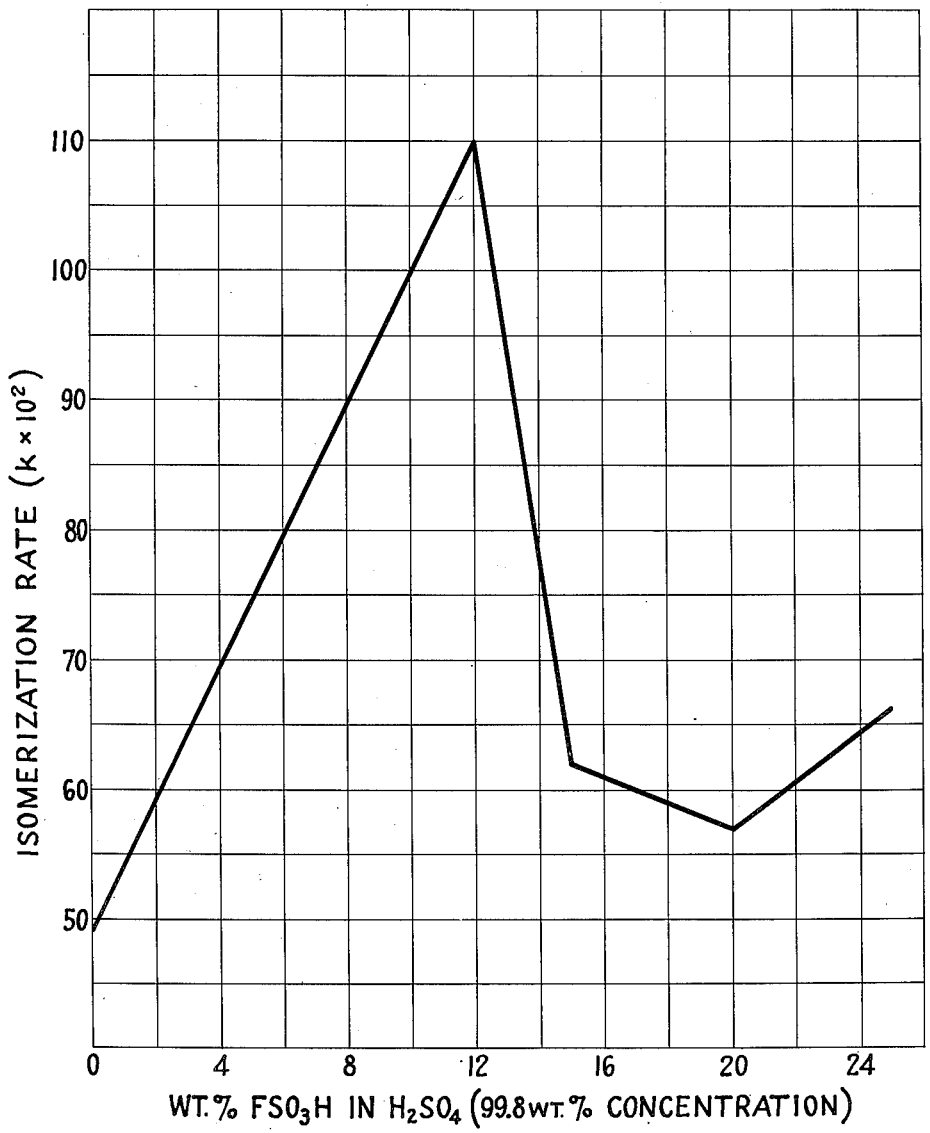

The above data are plotted in Figure 2. It will be noted that fluosulfonic acid exerted a marked promoting effect on the sulfuric acid, which effect was essentially linearly related to the concentration of fluosulfonic acid, achieving a maximum at 12 weight percent $FSO_3H$ and thereafter declining sharply upon further increases in the concentration of $FSO_3H$ in the catalyst. It will be evident from the data that very marked and substantial promoting effects are obtained in the range of about 6 to 14 weight percent $FSO_3H$, based on the weight of sulfuric acid catalyst, and especially in the range of about 6 to 12 weight percent $FSO_3H$. Usually it is desirable to maintain the $FSO_3H$ concentration below 12 percent since, as will be apparent from Figure 2, the rate of isomerization is considerably less sensitive to fluctuations in $FSO_3H$ catalyst concentrations below 12% than above 12%.

EXAMPLE 3

The effects of variations in the ratio of $FSO_3H$—$H_2SO_4$:hydrocarbon upon the rate of isomerization of 3-methylpentane are presented in the following table. In each instance, 166 grams of 3-methylpentane were contacted with the indicated amount of the mixed acid catalyst, which was a 12 weight percent solution of $FSO_3H$ in 99.9 weight percent $H_2SO_4$, at 20–25° C. for 1 hour.

TABLE 3
*Isomerization of 3-methylpentane*

| Mixed Acid Catalyst, g. | Wt. Ratio Acid:HC | $k \times 10^3$ |
|---|---|---|
| 166 | 1.0:1.0 | 115 |
| 125 | .75:1.0 | 53 |
| 83 | .50:1.0 | 30 |
| 42 | .25:1.0 | 15 |

It appears from the above data that ordinarily it is desirable to employ at least about one-half part by weight of the acid catalyst per part by weight of hydrocarbon, preferably equal parts by weight of the mixed acid catalyst and hydrocarbon.

EXAMPLE 4

The effects of variations in $FSO_3H$ concentration in 99.8 wt. percent $H_2SO_4$ upon the rates of isomerization of 2,3- and 2,4-dimethylpentanes are presented in the following tables.

TABLE 4
*2,3-dimethyl pentane isomerization*

| $FSO_3H$ | $k \times 10^3$ |
|---|---|
| 0 | 15 |
| 12 | 21 |
| 18 | 16 |
| 24 | 10 |

TABLE 5
*2,4-dimethyl pentane isomerization*

| $FSO_3H$ | $k \times 10^3$ |
|---|---|
| 0 | 6.5 |
| 6 | 8.6 |
| 12 | 12 |
| 18 | 8 |
| 24 | 8 |

Figure 3:
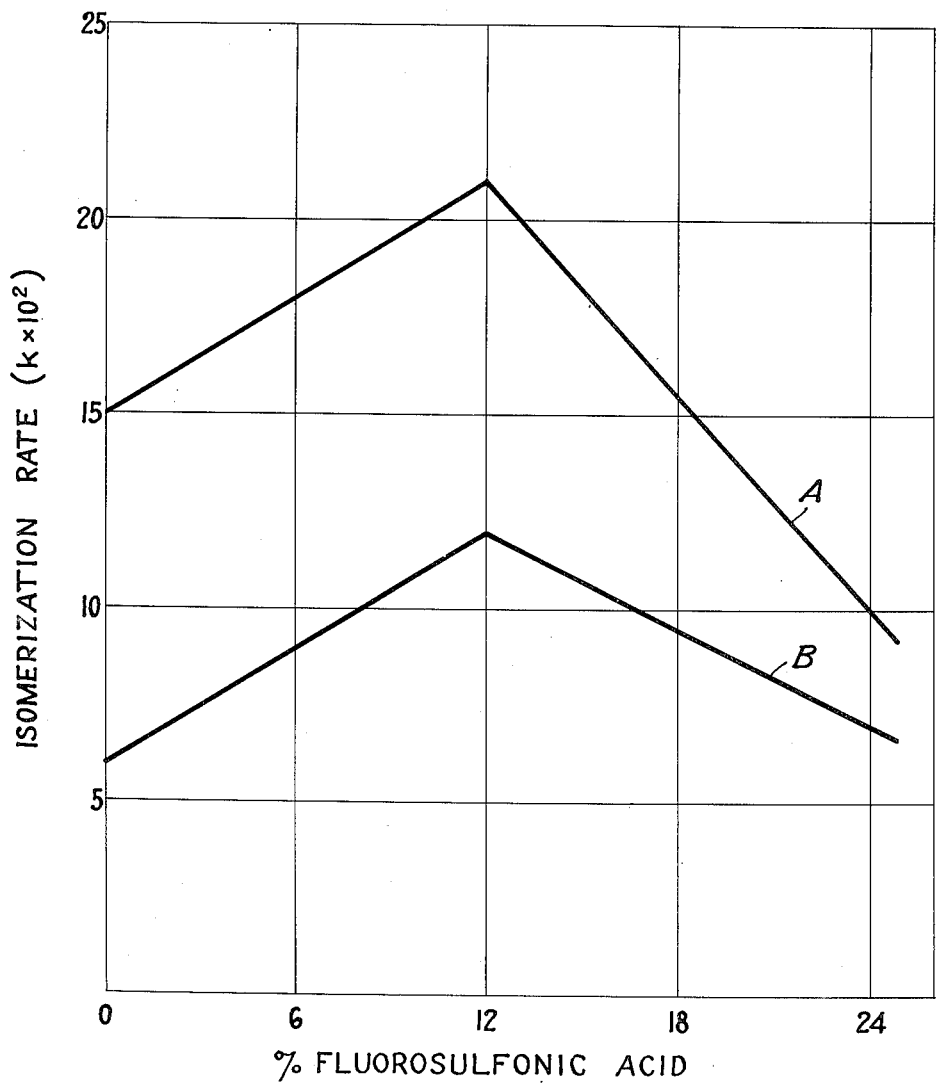

The above data are plotted as curves A and B, respectively, of Figure 3.

EXAMPLE 5

A mixture of 166 grams of 3-methylpentane, 163 grams of 99.7 weight percent $H_2SO_4$ and 3.3 grams of $ClSO_3H$ (2 weight percent based on the $H_2SO_4$) was stirred at room temperature for one hour, at which time it was found that 40 percent of the charging stock had been converted to 2-methylpentane ($k=0.59$). It was noted that some hydrolysis of the $ClSO_3H$ occurred, since there was some evolution of HCl. The inclusion of the above small percentage of $ClSO_3H$ in the sulfuric acid catalyst increases the rate of isomerization about 25% over that obtained with the acid catalyst alone in a control run. Caustic titration indicated that the catalyst concentration, measured as sulfuric acid, was 98.9 weight percent after 15 minutes of reaction and 98.0 weight percent at the end of one hour of reaction.

Several attempts were made to use fluosulfonic acid alone as an isomerization catalyst. The 2- and 3-methylpentanes were separately stirred with an equal weight fluosulfonic acid. The isomerization reaction went very rapidly, but there was some cracking so that the refractive indices could not be used for rate determinations because it is difficult to compensate for the error caused by the presence of the cracked product. The liquid hydrocarbon recoveries were 88 and 80% for the 2- and 3-methylpentane, respectively, indicating that there is some loss by cracking to form light gases.

When 2,3- and 2,4-dimethylpentanes were treated in the same manner with fluosulfonic acid, they cracked more readily than monomethylpentanes. Gaseous cracked products were observed passing out of the reacting mixture. The liquid hydrocarbon recovery was about 60% in each case, indicating considerable cracking.

In general, oxygen-, nitrogen- and sulfur-containing organic compounds are quite readily absorbed in sulfuric acid and tend to reduce the capacity of our mixed acid catalysts for high rate catalytic isomerization of charging stocks employed in the practice of our invention.

Figure 4:
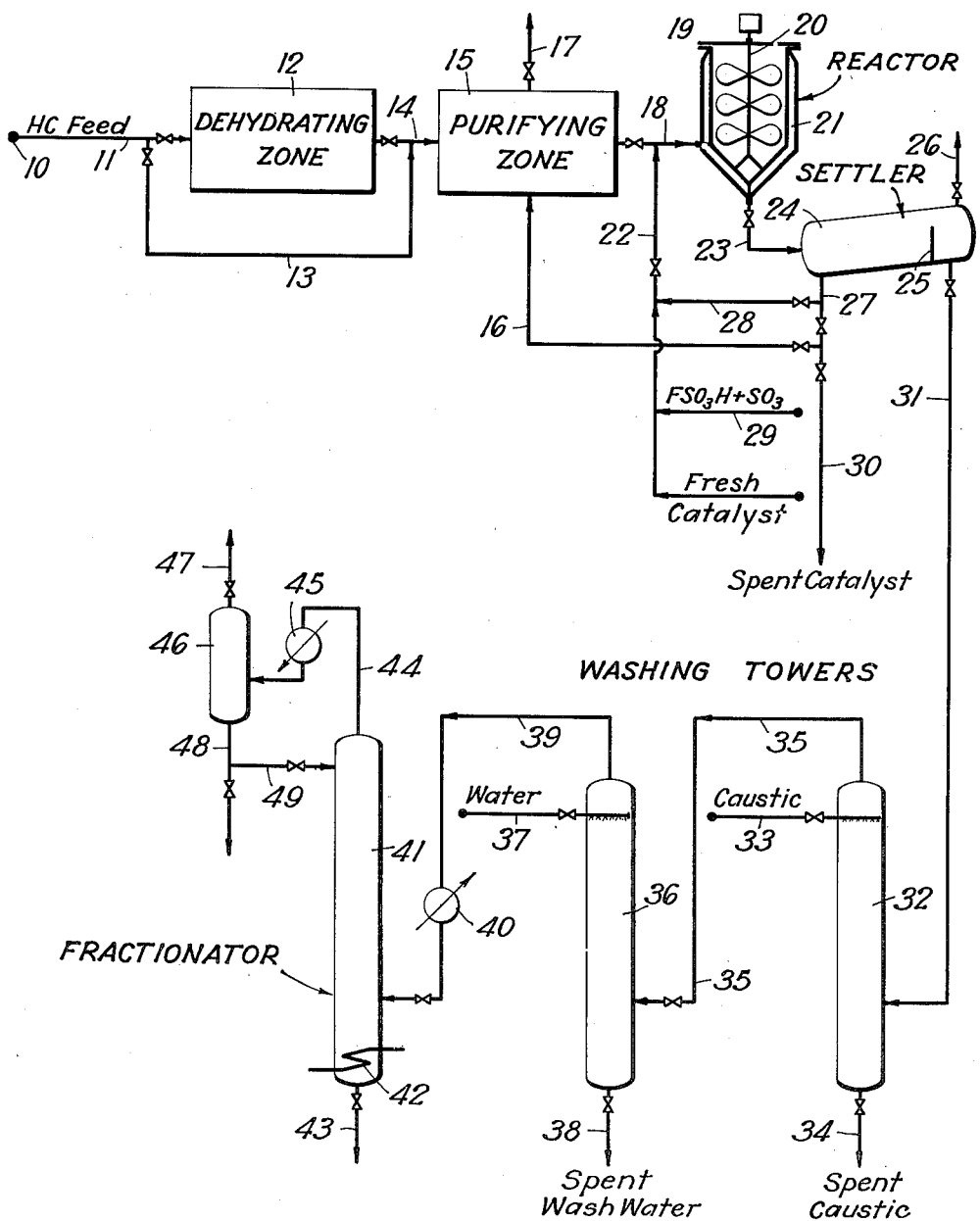

In order more fully to illustrate a practical mode of operating the process of our invention, reference is made to the flow diagram, Figure 4. A suitable hydrocarbon charging stock, for example 2,4-dimethylpentane, is passed from source 10 through a valved line 11 into dehydrating equipment schematically illustrated and designated by numeral 12. The dehydrating zone may be a vessel partially filled with a solid dehydrating packing material, for example an adsorbent alumina, silica gel, Florite or the like to remove both suspended and dissolved water from the hydrocarbon charging stock. To remove only suspended water from the hydrocarbon charging stock we may employ a vessel containing degummed wood shavings (excelsior) as a packing medium. If desired, all or a portion of the charging stock may be by-passed around zone 12 through valved line 13, passing with the hydrocarbon effluents, if any, of zone 12 into valved line 14, thence to a schematically illustrated purifying zone 15. In the purifying zone, the hydrocarbon charging stock is substantially freed of organic oxygen, nitrogen and sulfur compounds, as well as any aromatic hydrocarbons, such as benzene, and olefins therein contained.

A desirable mode of purifying a hydrocarbon charging stock comprises contacting it with partially spent acid catalyst derived from the isomerization reaction, shown entering the purifying zone through valved line 16 and leaving through valved line 17. The concentration of the sulfuric acid in the partially spent catalyst may range from about 91 to about 99 weight per cent, preferably 98 to 99 weight per cent, sulfuric acid. In order to purify the hydrocarbon feed stock in zone 15, between about 0.5 and about 2.0 parts by weight of partially spent acid catalyst may be contacted with each unit weight of hydrocarbon at a temperature between about 10° C. and about 50° C. under a pressure sufficient to maintain a liquid phase, usually between about 0 and about 50 p. s. i. g., for a period sufficient to effect substantial purification, usually between about one and about fifteen minutes. The partially spent acid catalyst is a highly effective purifying or pretreating agent for the hydrocarbon charging stock to be isomerized. It should be understood, however, that other methods for removing the above-designated impurities from the hydrocarbon charging stock may also be employed. If it is desirable or necessary, the hydrocarbon charging stock purified by acid or other treatment may be redistilled before charging it to the isomerization reaction zone. It should be noted that the partially spent acid material which may be employed as a purifying agent is sufficiently strong to absorb substantial amounts of water from the hydrocarbon feed stock.

The purified hydrocarbon charging stock is passed from zone 15 through valved line 18 into the isomerization reactor 19. Fresh acid catalyst, e. g. a mixture of sulfuric acid having a concentration of 99 to 100 weight percent and between about 2 and about 15 percent by weight of $FSO_3H$ or $ClSO_3H$, preferably about 6 to about 14, or 12 percent by weight, based on said sulfuric acid, may be charged to reactor 19 through valved lines 22 and 18. The isomerization reactor is represented in Figure 4 as an autoclave provided with an efficient mechanical stirrer 20, such as is ordinarily employed in effecting sulfuric acid-catalyzed alkylation of isoparaffinic hydrocarbons with olefinic hydrocarbons. Reactor 19 may be provided with a temperature-control jacket or coils 21. It should be understood that other forms of reactor may be employed, for example high speed pumps, such as centrifugal pumps, preferably in series with knot hole mixers, jet mixers, or the like, in order to prepare a suitable emulsion of the hydrocarbon charging stock and the acid catalyst.

The hydrocarbon charging stock may be contacted with between about 0.5 and about 2 parts by weight of the mixed acid catalyst at a temperature between about 15° and about 50° C., preferably about 20° to about 30° C. The contacting period of the hydrocarbon in the reactor may range from about ten to about one hundred minutes.

Upon completion of the desired reaction period, the reaction mixture is discharged from the reactor through valved line 23 to a settling drum 24 provided with a weir 25 and a valved vent line 26. If desired a cooler (not shown) may be interposed in line 23 between reactor 19 and settler 24. The settler may be operated at a temperature between about 10° and about 50° C. and the liquid contents are maintained therein for a sufficient period of time to permit the reaction mixture to be resolved into a lower layer of partially spent acid catalyst and an upper hydrocarbon layer which flows over weir 25 into the upper portion of the settler. The acid layer is withdrawn from settler 24 through valved line 27, whence all or part thereof may be recycled through valved line 28, thence through valved lines 22 and 18 into reactor 19. It is usually desirable to withdraw part of the partially spent sulfuric acid from the reaction system and to fortify the fraction of recycled acid catalyst with fluosulfonic acid, $SO_3$ or fuming sulfuric acid to bring it to the desired strength (99 to 100 weight per cent sulfuric acid). A solution of $FSO_3H$ and fuming sulfuric acid or $SO_3$ can be introduced into the recycle acid stream through valved line 29. Alternatively the catalyst in the reaction system may be fortified by the introduction of HF and $SO_3$ through line 29, preferably using an amount of $SO_3$ in excess of the stoichiometric amount needed to combine with HF to form $FSO_3H$ and sufficient to increase the sulfuric acid strength of the catalyst to about 99–100 wt. percent. Partially spent acid catalyst is withdrawn from the system through valved line 30 and is replaced by fresh acid catalyst entering the system through valved line 22. If desired, all or part of the partially spent acid catalyst may be diverted from valved line 30 through valved line 16 for passage to the feed stock purifying zone 15.

Hydrocarbons are withdrawn from the upper portion of settler 24 through valved line 31 for passage into the lower portion of a washing tower 32 provided with a valved inlet line 33 for the admission of aqueous alkali to the upper portion of the tower. The small proportion of acid carried over with the hydrocarbons from the settler is removed by reaction with the caustic, spent caustic being withdrawn from the lower end of tower 32 through valved line 34.

The neutralized hydrocarbon mixture is withdrawn from the upper end of tower 32 through valved line 35, whence it is passed into washing tower 36 provided with a valved inlet line 37 in the upper portion thereof for the admission of water and a valved line 38 in the lower end thereof for the removal of spent wash water. The water-washed mixture of hydrocarbon reaction products is passed from the upper end of tower 36 through valved line 39 and heat exchanger 40 into a fractionating tower 41 provided with a reboiler coil 42.

In the present illustrative example in which the isomerization of 2,4-dimethylpentane to 2,3-dimethylpentane is described, the 2,3-dimethylpentane product (boiling point, 89.8° C.) is removed as a bottoms fraction from fractionator 41 through valved line 43. Unconverted 2,4-dimethylpentane (boiling point, 80.6° C.) distills overhead through line 44, whence it is passed through condenser 45 into an accumulator drum 46 provided with valved vent line 47. A portion of the 2,4-dimethylpentane is withdrawn from the lower end of drum 46 through valved line 48, whence a part thereof may be passed through valved line 49 into the upper portion of fractionator 41 to serve as reflux and the remainder withdrawn from the system or, preferably, recycled to reactor 19.

It is extremely advantageous to recycle 2,4-dimethylpentane from valved line 48 to reactor 19 since this material, having been subjected to extensive contact with the strong acid catalyst, usually contains no impurities which would tend to react with further quantities of the acid catalyst, these having been removed in the first contacting operation in reactor 19. The isomerization of 2,4-dimethylpentane to 2,3-dimethylpentane results in an ASTM clear octane number increase from 83.8 to 89 and in an increase of the F-4 (rich mixture) octane number from 83 to 143.

Although we have described mechanical agitation as a means for effecting intimate contacting of charging stock with the acid, other means of effecting said contact may be employed for the purposes of our invention. Thus, stearic acid may be used in proportions between about 0.5 and about 1 per cent by weight, based upon the weight of the acid, to form a stable emulsion of the hydrocarbon charging stock, for example 3-methylpentane, and the acid catalyst. Isomerization proceeds in the emulsion thus produced at a rate which is not substantially different from the rate obtained by effecting intimate contact of the acid and hydrocarbon by mechanical means. If desired, the emulsion may be stirred mechanically from time to time. Upon completion of the desired reaction in the emulsion, the emulsion may be broken by contacting with water, which dissolves and dilutes the sulfuric acid, hydrolyzes the fluosulfonic acid, and permits the hydrocarbon reaction products to separate as a supernatent liquid layer, whose components can then be separated by fractional distillation. The diluted acid can be concentrated and employed as a catalyst component in further isomerization operations. An alternative method of resolving the acid-hydrocarbon emulsion involves distillation of the hydrocarbon from the emulsion, preferably under reduced pressure; this method is advantageous because little or no acid concentration before recycle thereof to isomerization is necessary. Still another, and possibly a preferred, method of treating the emulsion in which the desired reaction has been completed is to centrifuge the emulsion to separate converted hydrocarbons and acid catalyst, which can be re-used.

Although in specific working examples we have described the isomerization of monomethyl- and dimethylpentanes, it will be appreciated that our invention is not thus limited and may be applied to numerous other hydrocarbon species, e. g., to the isomerization of 2- or 3-methylhexane or the like. It will be apparent from the foregoing that the shift of the methyl group about a single carbon atom could be applied to other hydrocarbons such as cis- and trans-1,2-dimethyl cyclohexane, cis- and trans-1,2-dimethylcyclopentane and the like.

Broadly, the isomerization process of the present invention may be applied to alkyl-substituted, particularly methyl-substituted, saturated hydrocarbons containing at least 6 carbon atoms in the molecule, containing no quaternary carbon atoms and containing a secondary carbon atom adjacent the alkyl- or methyl-substituted carbon atom. For purposes of definition, it may be remarked that a primary carbon atom is linked by one valence bond to another carbon atom and by its remaining valence bonds to hydrogen. A secondary carbon atom is linked to two other carbon atoms, the remaining two valence bonds being satisfied by hydrogen. A tertiary carbon atom is linked to 3 other carbon atoms, the remaining valence bond being satisfied by hydrogen. A quaternary carbon atom is linked by all four of its valence bonds to other carbon atoms.

Hydrocarbon products produced by the process of the present invention may find application as high octane number motor fuels, solvents, and as intermediates for chemical synthesis, for the preparation, for example, of halogen derivatives, nitro derivatives, sulfonates, alcohols, ketones, Grignard reagents and the like.

Having thus described our invention, we claim:

1. A process for isomerizing a saturated hydrocarbon having an alkyl substituent on a non-terminal carbon atom, said hydrocarbon containing at least 6 carbon atoms per molecule, no quaternary carbon atom and at least one secondary carbon atom adjacent an alkyl substituted carbon atom, which process comprises intimately contacting said hydrocarbon with a catalytic proportion of an acid catalyst comprising essentially sulfuric acid having an initial concentration between 99 and 100 per cent sulfuric acid and between about 2 and about 15 per cent by weight, based on said sulfuric acid, of a halogen sulfonic acid selected from the group consisting of fluosulfonic acid and chlorosulfonic acid at an isomerization reaction temperature, and separating an isomate thus produced.

2. The process of claim 1 wherein the alkyl substituent is methyl.

3. The process of claim 1 wherein the saturated hydrocarbon is a methylpentane.

4. The process of claim 1 wherein the saturated hydrocarbon is a dimethylpentane.

5. The process of claim 1 wherein the saturated hydrocarbon is a stereoisomeric dimethylcyclohexane.

6. The process of claim 1 wherein the halogen sulfonic acid is fluosulfonic acid.

7. The process of claim 1 wherein the halogen sulfonic acid is chlorosulfonic acid.

8. A process for isomerizing a saturated hydrocarbon having a methyl substituent on a non-terminal carbon atom, said hydrocarbon containing at least 6 carbon atoms per molecule, no quaternary carbon atom and at least one secondary carbon atom adjacent a methyl substituted carbon atom, which process comprises intimately contacting one part by weight of said hydrocarbon with between about 0.5 and about 2 parts by weight of an acid catalyst comprising essentially sulfuric acid having an initial concentration between 99 and 100 weight per cent sulfuric acid and between about 2 and about 15 percent by weight, based on said sulfuric acid, of a halogen sulfonic acid selected from the group consisting of fluosulfonic acid and chlorosulfonic acid at a temperature between about 15° C. and about 50° C. for a period of time sufficient to effect substantial isomerization, and separating an isomate thus produced.

9. The process of claim 8 wherein the initial concentration of the sulfuric acid catalyst is between about 99.3 and 99.8 weight per cent sulfuric acid and the halogen sulfonic acid is fluosulfonic acid.

10. In a process for isomerizing a saturated hydrocarbon containing isomerization-inhibiting impurities, said saturated hydrocarbon having an alkyl substituent on a non-terminal carbon atom, said hydrocarbon containing at least 6 carbon atoms per molecule, no quaternary carbon atom and at least one secondary carbon atom adjacent an alkyl substituted carbon atom, the steps of contacting said hydrocarbon in a purifying zone with partially spent acid catalyst, derived from the isomerization process hereinafter defined, in quantity sufficient to remove at least a substantial proportion of said isomerization-inhibiting impurities, thereafter intimately contacting the hydrocarbon thus purified in a reaction zone with a catalytic proportion of an acid catalyst comprising essentially sulfuric acid having an initial concentration between 99 and 100 weight per cent sulfuric acid and between about 2 and about 15 percent by weight, based on said sulfuric acid, of a halogen sulfonic acid selected from the group consisting of fluosulfonic acid and chlorosulfonic acid at an isomerization reaction temperature, withdrawing spent acid catalyst having a titratable acidity between 91 and 99 weight per cent as sulfuric acid from said reaction zone, and recycling at least a portion of said acid catalyst from said reaction zone to said purifying zone.

ALAN K. ROEBUCK.
BERNARD L. EVERING.

REFERENCES CITED

The following references are of record in the file of this patent:

UNITED STATES PATENTS

| Number | Name | Date |
|---|---|---|
| 2,354,866 | Lang | Aug. 1, 1944 |
| 2,373,740 | Birch et al. | Apr. 17, 1945 |
| 2,396,486 | Ballard | Mar. 12, 1946 |